United States Patent
Heuser et al.

(10) Patent No.: US 7,866,752 B1
(45) Date of Patent: Jan. 11, 2011

(54) VEHICLE SEAT, AIR PASSENGER SEAT IN PARTICULAR

(75) Inventors: Jorg Heuser, Schwabisch Hall (DE); Erwin Ilias, Schwabisch Hall (DE)

(73) Assignee: Airbus Deutschland GmbH, Hamburg (DE)

( * ) Notice: Subject to any disclaimer, the term of this patent is extended or adjusted under 35 U.S.C. 154(b) by 757 days.

(21) Appl. No.: 10/585,550

(22) PCT Filed: Jan. 12, 2005

(86) PCT No.: PCT/EP2005/000237
§ 371 (c)(1),
(2), (4) Date: Oct. 15, 2007

(87) PCT Pub. No.: WO2005/066023
PCT Pub. Date: Jul. 21, 2005

(30) Foreign Application Priority Data
Jan. 12, 2004 (DE) .................. 10 2004 002 169

(51) Int. Cl.
*B60N 2/22* (2006.01)
(52) U.S. Cl. .................. 297/362.13; 267/232; 267/335
(58) Field of Classification Search .................. 297/14, 297/232, 332, 335, 354.1, 362.12, 362.13
See application file for complete search history.

(56) References Cited

U.S. PATENT DOCUMENTS

| | | | |
|---|---|---|---|
| 2,595,582 A | | 12/1948 | Hoven et al. |
| 3,037,812 A | * | 6/1962 | Monroe .................. 297/362.13 |
| 3,145,052 A | * | 8/1964 | Morgan .................. 297/354.1 |
| 3,594,037 A | * | 7/1971 | Sherman .................. 297/14 |
| 3,744,843 A | | 7/1973 | Barecki et al. |
| 3,762,766 A | | 10/1973 | Barecki et al. |
| 4,681,369 A | * | 7/1987 | Simpson .................. 297/316 |
| 5,540,483 A | | 7/1996 | Marechal |
| 5,568,961 A | * | 10/1996 | Colasanti .................. 297/362.12 |
| 5,829,836 A | * | 11/1998 | Schumacher et al. .................. 297/257 |
| 6,481,798 B2 | * | 11/2002 | Romca et al. .................. 297/354.1 |

(Continued)

FOREIGN PATENT DOCUMENTS

DE        2 153 578        5/1973

(Continued)

*Primary Examiner*—Peter R. Brown
(74) *Attorney, Agent, or Firm*—Vidas, Arrett & Steinkraus

(57) ABSTRACT

The invention relates to a vehicle seat, particularly an air passenger seat, comprising the following: a seat frame (10) having a number of seat dividers (12, 14, 16, 18); a number of seat backs, each being coupled to the seat frame between two seat dividers and whose position can be adjusted relative to the seat dividers by means of an adjusting device, and; a number of seat parts, which are each fastened to the seat frame between the seat dividers (12, 14, 16, 18) and of which at least one can be pivoted into an approximately vertical position. The invention is characterized in that the adjusting device has a lever device (28) and a spring element (38) for the seat back belonging to the pivotal seat part, and they are situated on one of the seat dividers, which limit the pivotal seat part, whereby being located on the side oriented toward the seat part. In addition, the lever device (28) is pivotally connected to the seat divider, a first lever arm (36) of the lever device is connected to the spring element (38), and a second lever arm (32) of the lever device is connected to the seat back.

9 Claims, 3 Drawing Sheets

U.S. PATENT DOCUMENTS

| | | | |
|---|---|---|---|
| 6,672,661 B2 * | 1/2004 | Williamson | 297/232 |
| 6,776,457 B2 * | 8/2004 | Muin et al. | 297/331 |
| 2004/0145225 A1 * | 7/2004 | Alter | 297/367 |

FOREIGN PATENT DOCUMENTS

| | | |
|---|---|---|
| DE | 3433590 | 3/1986 |
| DE | 195 34 024 A1 | 3/1997 |
| DE | 102 14 104 C1 | 11/2003 |
| WO | 02/066283 A1 | 8/2002 |

* cited by examiner

VEHICLE SEAT, AIR PASSENGER SEAT IN PARTICULAR

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The present invention is related to a vehicle seat, an air passenger seat in particular, with a seat frame having several seat separators, between which one sitting part and one back rest at a time is articulated on the seat frame, the back rest being adjustable in its position with respect to the seat separators via an adjustment device.

From DE 102 14 104 C1 the entire contents of which are hereby incorporated by reference in its entirety, an air passenger seat with a collapsible sitting part is known. The back rests are each one swivelling articulated on neighbouring seat separators. The seat frame has a support beam, running in the horizontal direction, on which horizontally running consoles are attached. The free end of the consoles is connected with a pneumatic spring, the free end of which has a connection piece for connection with the back rest. By adjusting the length of the pneumatic spring, the back rest is inclined into the desired position. No adjustment devices for the back rest are arranged on the supporting beam in the region of the collapsible sitting part. The back rest for the collapsible sitting part is adjusted by a pneumatic spring which is arranged under the neighbouring sitting part, the force of which is transmitted to the back rest of the neighbouring seat via a bolt, which is mounted in the seat separator. It has proven to be disadvantageous in this construction that it enables to realise only one seat of the air passenger seat in a collapsible manner, because otherwise the consoles of the springs for the articulation of the back rests would be obstacles. However, just with longer seat rows it is desirable two realise two or more seats, even located adjacent to each other, in a collapsible manner. Further, it has proven that the moments acting on the bolt for the transmission of the force to the neighbouring back rest are as great that the bolt and the assigned component parts have to be dimensioned massively, through which manufacturing cost and weight are increased.

From DE 195 34 024 C2 the entire contents of which are hereby incorporated by reference in its entirety, a seat group is known in which at least one sitting part is collapsible upward via a coupling device. Collapsing the sitting part upward takes place via an arm rest which is assigned to the sitting part. An adjustment device for the back rest is not described in detail.

The present invention is based on the objective to provide a vehicle seat with at least one upward-collapsible sitting part, the back rest of which can be inclined by a simple and robust adjustment device.

BRIEF SUMMARY OF THE INVENTION

The vehicle seat according to the invention has a seat frame with several seat separators. Between two seat separators, a back rest and a sitting part are arranged at a time. Each back rest is articulated between two adjacent seat separators directly on the seat frame or on one or both seat separator(s), and is adjustable in its position with respect to the seat separators via an adjustment device. The sitting parts are fixed each one between the seat separators directly on the seat frame or on one or both seat separator(s), at least one sitting part being collapsible into an approximately vertical position in this. The adjustment device for that back rest which is assigned to the collapsible sitting part, is arranged between the two seat separators enclosing the back rest on one of these seat separators, and it has a lever device articulated on the seat separator and a spring element connected to the seat separator, which is articulated on one end on a first lever arm, the second lever arm of the lever device being connected with the back rest. Thus, the adjustment device according to the invention is each arranged between the seat separators of an upward-collapsible sitting part, so that it is possible to realise two or more sitting parts for the vehicle seat in a collapsible manner. Further, the force of the spring element on the back seat is transmitted via a lever device which is articulated on the seat separator, so that torsional elements on the lever device are avoided and it can be manufactured more easily and at lower cost. Further, the lever device has the very important advantage that it permits arrangement of the spring element with respect to the seat frame in such a manner that the spring element does not project into the free space formed by the collapsible seat or that it protrudes into it only in a small degree. Thus, knocking edges or stumbling traps which are dangerous for the passenger are avoided. The direct connection between seat separator and back rest without the detour via a console and the oval main spar additionally leads to a reduction of the clearance, because the kinematic chain takes place via less connected elements.

Suitably, the seat frame has a support running essentially in the horizontal direction, which is connected with the seat separators. At least two of the seat separators are equipped with feet. Alternatively, seat separators and seat feet can be attached as separate component parts in the seat frame.

Preferably, one at a time of the assigned seat separators for each back rest has a horizontally running arm, which points away from the back rest. The spring element is suitably fixed on the arm. With respect to known seat frames, like those in DE 102 14 104 C1, there is the advantage that no separate support or console has to be fixed on the supporting beam in order to attach the spring element.

According to the invention, the collapsible sitting part is articulated on the seat separator with at least one support arm. A readjustment device is provided for the collapsible sitting part, which readjusts the latter into its approximately vertical position. The readjustment device has preferably a spring element, which runs essentially along the seat separator. Through the spring element, the not loaded sitting part may be automatically collapsed upward, for instance, in order to release the space before the seats.

The object according to the invention is also resolved by a vehicle seat which has a seat frame with several seat separators. Between a pair of neighbouring seat separators, one back rest and one sitting part are arranged at a time. The back rest is articulated on the seat frame, preferably on one or both of the neighbouring seat separators, and is adjustable in its position with respect to the seat separators by an adjustment device. The sitting parts are each fixed on the seat frame between the seat separators, preferably at least one sitting part being collapsible into an approximately vertical position. The adjustment device has at least one spring element, preferably for the back rest belonging to the collapsible sitting part arranged in the back rest, which runs substantially parallel to the swivelling axis of the back rest and the one end of which co-operates with the seat separator such that the length of the spring element determines the inclination of the back rest. In this embodiment, a reduction of the free space before the seat is also avoided by the arrangement of the spring element in the back rest, and thus the possibility for an upward-collapsible sitting part is created. Further, even in this embodiment additional stably dimensioned component parts, which transmit torsional moments to a neighbouring back rest, can be omitted.

In a preferred embodiment, the adjustment device has a guidance, which is fixedly connected with the seat separator and in which the one end of the spring element is movably mounted. Preferably, the guidance extends linearly, the guiding plane being inclined with respect to the horizontal direction.

In another embodiment, the one end of the spring element can co-operate with a reversing lever, which is connected with the spring element on one end and the other end of which is arranged in an accommodation which is fixedly connected with the seat separator, the reversing lever being articulated on the back rest between its ends. In a further embodiment, the reversing lever is swivelling mounted in a mounting on the seat separator.

Suitably, the arms of the lever are substantially at right angles with respect to each other.

BRIEF DESCRIPTION OF SEVERAL VIEWS OF THE DRAWINGS

Preferred embodiments of the invention are explained in more detail below by means of the figures.

DETAILED DESCRIPTION OF THE INVENTION

Figure 1:
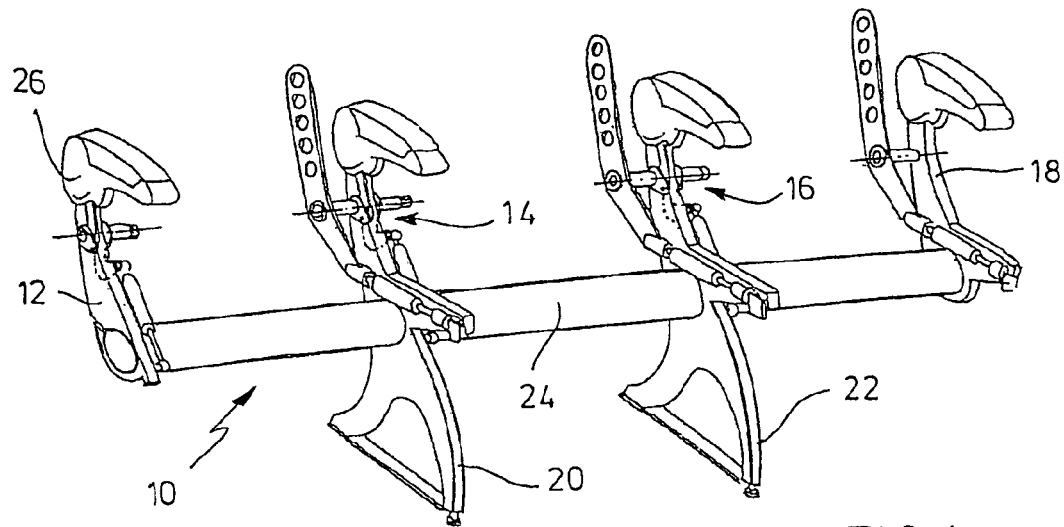
FIG. 1 shows a seat frame with the adjustment device for back rests according to the invention.

While this invention may be embodied in many different forms, there are described in detail herein a specific preferred embodiment of the invention. This description is an exemplification of the principles of the invention and is not intended to limit the invention to the particular embodiment illustrated FIG. 1 shows a seat frame 10 with seat separators 12 to 18, wherein the middle seat separators 14 and 16 are provided with feet 20, 22. The seat frame 10 has a support 24, running essentially horizontally through the seat separators 20 and 22 and supporting the seat separators 121 and 18 without feet. The support 24 is realised as a pipe with oblong cross section.

Each of the seat separators is provided with an arm rest 26.

The adjustment device for the back rest between the seat separators 12 and 14 has a lever 28, which is rotatably mounted on the seat separator via a pipe 30. In the shown example, the lever 28 is provided with bores 34 on one end 32 for the sake of saving material, the end 32 being arranged in the back rest and transmitting the force onto the back rest. The end 36 of the lever 28 pointing towards the support 24 is connected with a pneumatic spring 38. The free end of the pneumatic spring 38 is kept on the seat separator 14 via a link 40. In the region of the link 40, the seat separator is provided with a projecting arm 42. This has the advantage that the force applied to the back rest is not introduced into the support 24 via the lever 28 and the spring 38, but via the arm 42 into the seat separator.

In order to adjust the position of the arm rest, the lever 28 swivels around its mounting 30. When the pneumatic spring 38 is extended, the end 32 of the lever 28 swivels forward towards the sitting part. When the pneumatic spring 38 is retracted, the end 32 of the lever 28 swivels away from the sitting part and the back rest goes back.

Figure 2:
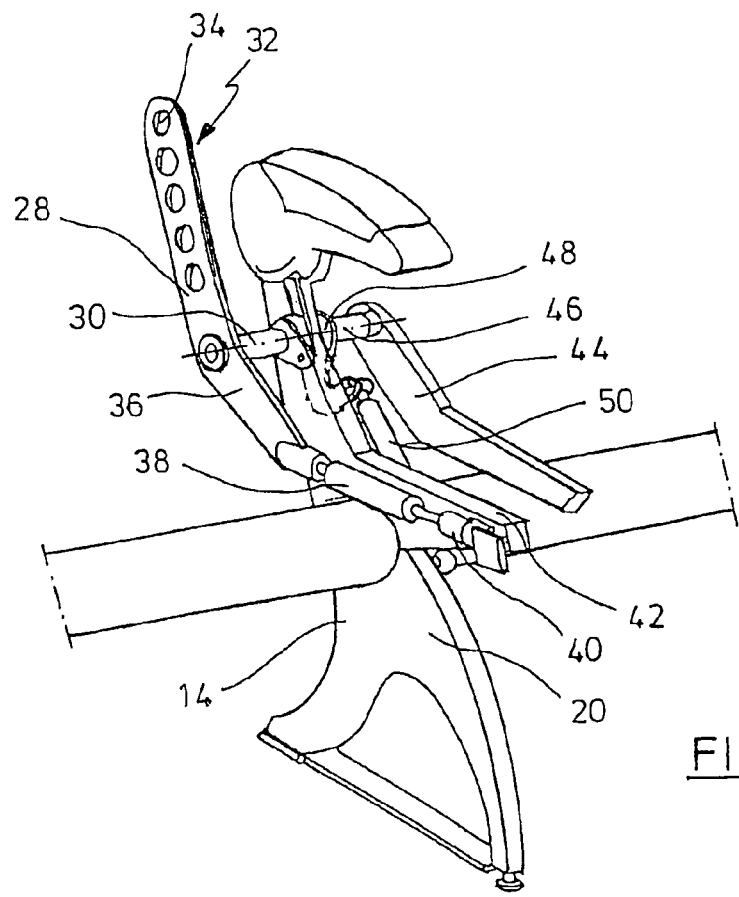
FIG. 2 shows a seat separator with adjustment device for the back rest and collapsing device for the sitting part.

The device for collapsing upward the collapsible sitting part is also represented in FIG. 2. An arm 44 is also articulated on the seat separator 14 via a bolt 46. In this, the swivelling axes of the arm 44 and of the lever 28 coincide, so that a greater stability for the seat separator is achieved. A second arm of the device for collapsing upward is freely rotational mounted on the opposite seat separator, the swivelling axis of both arms laying on each other. On the bolt 46, a lever element 48 is torque proof arranged which is connected to a second spring 50 on its free end. The not loaded sitting part collapses upward by extending or retracting the spring 50.

In the sitting part represented in FIG. 1, the mechanism for collapsing upward the sitting part is attached on the right-side seat separator (with respect top a person sitting on the seat) for each seat. For a left-side (seen from the flight direction) seat row it makes sense to attach the spring for the lifting mechanism of the seat on the right side of the passenger. For a right side row it makes sense to arrange it on the left side of the passenger. Thus, it is dealt with a seat in which each sitting part is collapsible. In doing so, the sitting part may be preferably provided with a supporting plane, on which a passenger can support himself on the sitting part which is collapsed upward. For the sake of simplicity, the support arm 44 for the sitting part is not represented in FIG. 1. On each left-side seat separator with respect to a sitting person, the lever 28 of the adjustment device for the back rest is provided.

Figure 5:
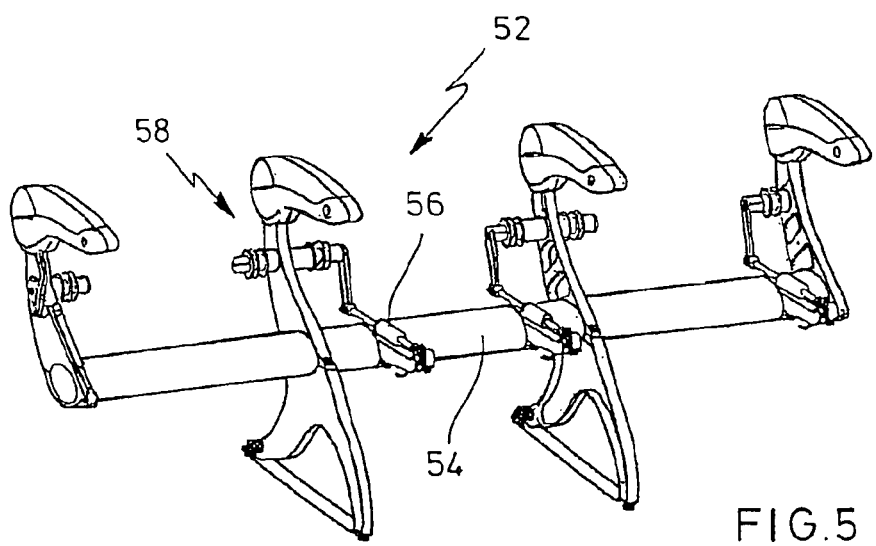
FIG. 5 shows a seat frame of the state of the art.

In the solution according to the invention, it becomes clear that each sitting part is collapsible upward on the seat frame. In the seat frame 52 known in the state of the art in FIG. 5, two adjustment devices for the back rest are attached on the middle seat, the force of a pneumatic spring 56 being transmitted to the (not represented) back rest via a bolt 58 through the assigned seat separator. Also, from FIG. 5 it becomes clear that the spring elements for the adjustment of the back rest project significantly farther from the support beam 54. In contrary, the use of a lever 28 according to the invention permits to arrange the assigned spring element on the seat separator such that it projects less far into the space.

Figure 3:
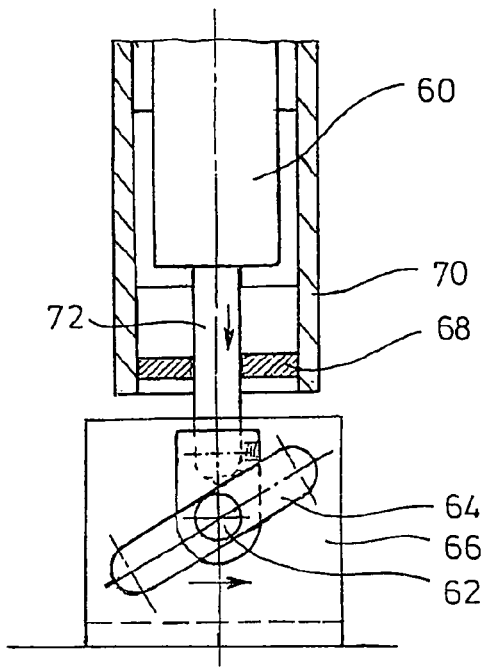
FIG. 3 shows a detail view of the spring element in a crank with linear guidance.

FIG. 3 shows an alternative realisation of the adjustment device for the back rest, in which the pneumatic spring 60 engages into a linear guidance 64 with a guide cam 62. The linear guidance 64 is provided in a crank 66. The spring element 60 disposed in the back rest has a sleeve 70 with a guidance 68, which supports the rod 72 of the spring 60.

By extending the rod 72, the sleeve 70 moves with respect to the crank 62, so that the back rest is adjusted.

Figure 4:
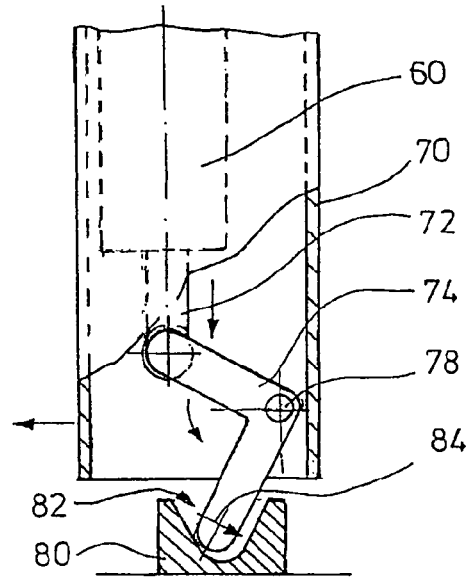
FIG. 4 shows a detail view of the spring element with a reversing lever in a crank-like accommodation.

FIG. 4 shows an alternative realisation, same elements being provided with same reference numerals here. The rod 72 is connected with a right-angled reversing lever 74 on one end. The reversing lever is articulated on the free end of the rod 72. In its centre, the lever 74 is swivelling mounted in the pipe 70. The end 84 of the reversing lever is arranged in a recess 82 of a crank 80. By extending and retracting the rod 72, the reversing lever 74 swivels around its swivelling axis 78 and moves the back rest with respect to the crank 80.

Figure 6:
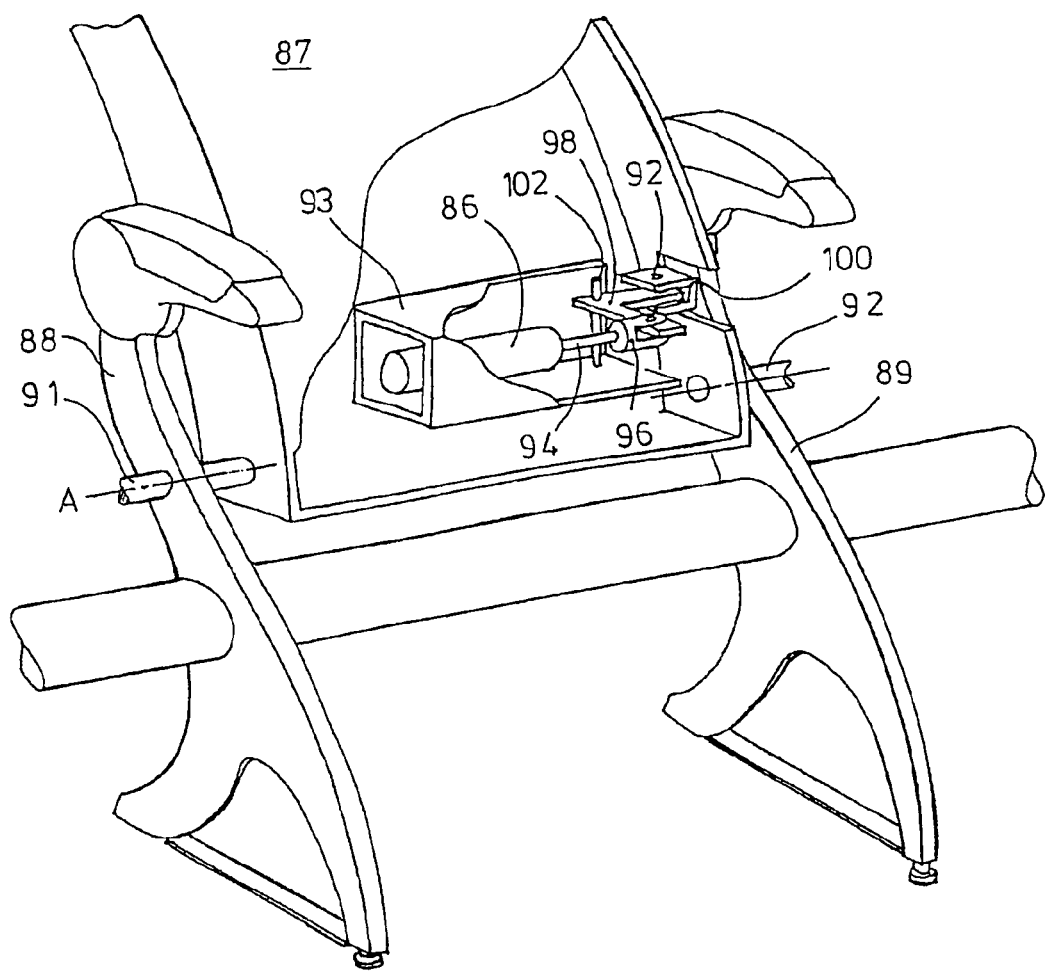
FIG. 6 shows a back rest with a traverse running spring element for the adjustment device.

FIG. 6 shows a further embodiment with a spring element 86 running substantially in parallel to the swivelling axis A of the back rest. The partially represented back rest 87 is swivelling mounted with each one bolt 91 and bolt 92 between the seat separators 88 and 89. The adjustment of the angular position of the back rest 87 takes place via the spring element 86, which is disposed in the back rest. It is also possible to use the realisation from FIG. 3 or FIG. 4 with such a back rest. A back rest 87 realised in such a manner can be used on the passenger seat without depending from sitting parts which are upward collapsible.

For the purpose of better cushioning, the spring element 86 can be arranged in a case 93, which is shown in a partial section in FIG. 6.

The spring element 86 has a spring arm 94, which ends in a connection piece 96. The connection piece 96 is articulated on a reversing lever 98. The reversing lever 98 has a substantially right-angled shape. The reversing lever 98 is swivelling mounted in a mounting 100 with its end pointing away from the spring element 86. The mounting 100 is fixedly connected to the seat separator 89. The reversing lever is mounted to swivel in its angle on a bolt 102, which is stationary connected with the case 83 or the back rest 87, respectively.

The whole adjustment device is arranged above the swivelling axis A, so that adjustment of the spring element 86 via the reversing lever 98 adjusts the angular position of the back rest 87.

The spring element 86 is preferably realised as a gas pressure spring, which is integrated above the turning point A into the back rest in the variants 3, 4 and 6. For force closure and for maintenance, mounting and so forth the spring is pre-mounted in a chassis, together with all the articulating and operating elements. The pre-mounted chassis is arrested without clearance in the back rest by a snap fit, which is not shown in more detail.

The pneumatic spring is installed to be laying vertical to the flight direction. The reversing of the working path of the spring takes place via an inclinedly arranged crank with linear guidance, as shown in FIG. 3, for instance. In turn, the crank is fixedly connected with the seat separator. The reversing of the working path of the spring can also take place via a tilting lever, as is shown in the variants from FIGS. 4 and 6 in an exemplary manner. In this, the connections of the reversing lever with the seat frame or the seat separator may take place via a fork-head shaped mounting 100 or via a crank, in which a ball-shaped end of the reversing lever is arranged, for example.

With upward directed back rest the spring is untensioned, whilst at back rest swivelled to the backside, the spring is tensioned. By releasing the spring via a locking device, the back rest can be swivelled backward manually. By releasing the locking device, the back rest stays in the actual position. By releasing the locking device and disburdening the back rest, the back rest swivels back into the upward position. When the locking of the spring (not represented) is released, the back rest can be swivelled towards the backside, a relative movement between the seat foot or the seat separator, respectively, and the back rest resulting in this. This movement is transmitted to a rocking lever. The rocking lever rotates in the clockwise direction, when seen from the upside. Through the rotation of the rocking lever, the relative movement between seat separator and back rest (in the flight direction) is transformed into a movement perpendicular to the flight direction. The movement of the lever compresses the spring. By releasing the locking device, the spring is decompressed. The back rest moves into the upward position again.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A passenger seat, an air passenger seat in particular, comprising:
   a seat frame, said seat frame having a support disposed in a horizontal direction;
   a plurality of seat separators connected to said seat frame;
   a plurality of back rests, each of said back rests having at least one adjustment device, each of said back rests being articulated on the seat frame between two of said seat separators and being adjustable relative to said respective seat separators;
   said seat frame further comprising a plurality of sitting parts, at least one of said sitting parts being pivotally connected to said seat frame between two of said seat separators wherein at least one of said sitting parts is collapsible into an approximately vertical position;
   said at least one adjustment device comprising a lever device and a spring element arranged on at least one of the seat separators delimiting said at least one collapsible sitting part, said lever device being pivotally connected to at least one of said plurality of said seat separators, said lever arm comprising a first lever arm connected to said spring element and a second lever arm connected to said back rest, wherein manipulation of at least one of said spring elements assist in adjustment of at least one of said back rests, said spring element reducing torque applied to the support.

2. A passenger seat according to claim 1, wherein at least two seat separators have supporting legs.

3. A passenger seat according to claim 1, characterised in that wherein at least two supporting legs and the seat separators are fixed on the seat as separate component parts.

4. A passenger seat according to claim 1, wherein at least one of the respective seat separators has an arm extending in a horizontal direction away from at least one of said plurality of back rests.

5. A passenger seat according to claim 4, wherein the spring device is fixed on the arm.

6. A passenger seat according to claim 1 wherein the at least one collapsible sitting part is articulated on the seat separator with at least one supporting beam.

7. A passenger seat according to claim 6, wherein the supporting beam is articulated on the seat separator opposite to the lever device.

8. A passenger seat according to claim 6, further comprising at least one a readjustment device connected to at least one of said plurality of seat separators, said readjustment device constructed and arranged to readjust the at least one collapsible sitting part into its a vertical position.

9. A passenger seat according to claim 8, wherein the readjustment device has a second spring element, said second spring element extending substantially along the seat separator.

* * * * *